United States Patent [19]

Patacca et al.

[11] Patent Number: 4,475,864
[45] Date of Patent: Oct. 9, 1984

[54] CONTAINMENT STRUCTURE

[75] Inventors: Angelo M. Patacca, Glastonbury, Conn.; Emile J. Premont, South Hadley, Mass.

[73] Assignee: United Technologies Corporation, Hartford, Conn.

[21] Appl. No.: 332,696

[22] Filed: Dec. 21, 1981

[51] Int. Cl.³ .............................................. F16P 1/02
[52] U.S. Cl. ....................................... 415/9; 415/119;
415/121 G; 415/219 R; 416/218; 416/190;
156/189; 138/110; 181/204; 181/222; 403/45;
242/75.3
[58] Field of Search ............... 415/9, 119, 219 R, 197,
415/121 G; 416/230, 218, 190; 403/43, 44, 45,
46, 344; 138/148, 113, 114, 110; 156/172, 184,
189, 191, 185, 162; 181/204, 213, 222; 242/75.3

[56] References Cited

U.S. PATENT DOCUMENTS

| 2,935,294 | 5/1960 | Angell | 415/121 G |
| 2,999,667 | 9/1961 | Morley | 415/196 |
| 3,602,602 | 8/1971 | Motta | 415/9 |
| 3,684,205 | 8/1972 | Rogow | 242/75.3 |
| 3,692,251 | 9/1972 | Melead | 242/75.3 |
| 3,739,731 | 6/1973 | Tabor | 220/414 |
| 3,794,708 | 2/1974 | Richards et al. | 156/189 |
| 4,377,370 | 3/1983 | Porcelli | 415/219 R |

FOREIGN PATENT DOCUMENTS

| 27756 | 4/1981 | France | 415/9 |
| 907562 | 10/1962 | United Kingdom | |
| 1453873 | 10/1976 | United Kingdom | |
| 1485032 | 9/1977 | United Kingdom | |
| 2037900 | 7/1980 | United Kingdom | 415/219 R |

Primary Examiner—Samuel Scott
Assistant Examiner—Brian J. Bowman
Attorney, Agent, or Firm—Gene D. Fleischhauer

[57] ABSTRACT

A circumferentially extending apparatus 46 for containing particles having an axial component and a radial component of velocity is disclosed. The apparatus is comprised of a support structure 48 and a flexible casing 50 formed of a fabric 78. The external surface of the support structure has a first diameter and a second diameter not equal to the first diameter at a location spaced axially from the location of the first diameter. The fabric is preloaded to increase the length of the fabric and is wrapped under tension about the surface of the support structure such that the installed length of the fabric is greater than the free length of the fabric. A method for forming the circumferentially extending structure is disclosed which includes the steps of forming a support structure and wrapping a preloaded fabric about the support structure to cause an elongation of the fabric and tension in the fabric in the installed condition, which varies depending on the diameter of the support structure.

25 Claims, 18 Drawing Figures

CONTAINMENT STRUCTURE

DESCRIPTION

1. Technical Field

This invention relates to a circumferentially extending structure for containing particles having an axial component of velocity and a radial component of velocity. The invention has particular application to the field of axial flow rotary machines and to the containment of particles resulting from the separation of a rotor blade from a rotating assembly in such a machine but is not limited to the field of axial flow rotary machines.

2. Background Art

In axial flow rotary machines, rotor assemblies are driven at high rotational speeds about an axis of rotation. The rotor assemblies include rotor disks and rotor blades. Foreign objects, such as birds, hailstones or other objects, which on occasion are ingested into the engine, may strike the blades causing parts of the rotor assembly to fragment or to separate from the rotor disk. During such a failure, pieces of the rotor assembly may be hurled outwardly from the rotor assembly with velocities of several hundred feet per second. Such velocities typically have components in the axial, tangential and radial directions. One device for containing such fragments is shown in British patent specification No. 1,245,415, issued to Mottram et al entitled "Improvements in or Relating to Fluid Flow Machines". Mottram shows a containment structure formed of two similar metal strip members wound together to form a helical shield about a casing. U.S. Pat. No. 2,999,667 entitled "Protective Arrangement for Use with Apparatus or Machines Having Rotating Parts", issued to Morely shows a containment structure formed of a web of interwoven wires which are continuous from one end of the web to the other. The web is disposed in coil form in a casing about an array of rotor blades.

Several patents show containment structures formed from synthetic fibers which are woven into a fabric or webbing. U.S. Pat. No. 4,057,359 entitled "Ballistic Nylon Fabric Turbine Governor Housing Shielding Means" issued to Grooman shows a flexible housing cover formed by stitching together two sections of a ballistic nylon fabric. Grooman mentions nylon, an aliphatic polyamide fiber, and Kevlar 49, an aromatic polyamide fiber available from the DuPont Corporation, as fibers which are suitable for forming the fabric. U.S. Pat. No. 3,602,602 issued to Motta entitled "Burst Containment Means" shows a containment means formed of a winding of tape over a machinery housing and aligned with the expected path of travel of part fragments to contain the part fragments during a failure of the rotary machine. No means are provided for bonding or fastening the adjacent turns of the winding to each other or to the housing about which the tape is wound. The winding of tape is formed of a ballistic nylon material rather than of an aromatic polyamide fiber fabric such as a Kevlar fabric. Use of a Kevlar fabric restrained in the fore and aft direction along the edges outwardly of Kevlar felt trapped radially between the Kevlar fabric and a honeycomb backed steel shell is a contemporaneous recommendation for a containment structure made in a NASA Final Report entitled "Development of Advanced Lightweight Containment Systems". This report was made under NASA Contract No. NAS3-21823.

In spite of this progress in containment structures, scientists and engineers are seeking to develop containment means which are light in weight and yet which provide containment of particles such that the particles do not escape from the nacelle surrounding the engine even though the particles have substantial axial, tangential and radial velocities.

DISCLOSURE OF INVENTION

According to the present invention, a structure for containing particles includes a circumferentially extending structure of variable external diameter wrapped with a fabric under tension such that the installed length of the fabric is greater than the free length of the fabric and varies in the axial direction.

In accordance with the present invention, a method for wrapping a fabric about a circumferentially extending structure to form a containment structure includes the steps of forming the circumferentially extending structure with a varying diameter and includes the step of preloading the fabric with a controlled tension before wrapping the fabric upon the structure to affect the operative movement of the fabric in the installed condition.

A primary feature of the present invention is a support structure having a varying diameter. The support structure is wrapped with a fabric under tension. The installed length of the fabric is greater than the free length of the fabric. The installed length of the fabric varies in the axial direction. In one embodiment, the leading edge portion of the fabric has a greater load and a greater tension than does the remaining portion of the fabric. In one embodiment, the installed length of the fabric is five percent greater than the free length of the fabric in the leading edge region of the fabric, and 3% greater than the free length of the fabric in the trailing edge region.

A primary advantage of the present invention is the containment of particles within a nacelle during a blade failure of the rotary machine which results from absorbing the kinetic energy of the particle with a fabric through a deflection of the fabric. Another advantage is the small radial profile of the nacelle which results from decreasing the radial deflection of the fabric during an impact of a particle as compared with structures using untensioned fabric. Still another advantage is the avoidance of the escape of particles between the edge of the fabric and the support structure by reason of the tension in the fabric. The tension is increased in the edge region of the fabric to contain particles having an axial velocity greater than those particles contained within the nacelle with fabric under a uniform tension.

Other features and advantages of the present invention will be apparent from the specifications and claims and from the accompanying drawings which illustrate an embodiment of the invention.

BRIEF DESCRIPTION OF THE DRAWINGS

FIG. 12 is a side elevation view taken along the lines 12—12 of FIG. 11;

BEST MODE FOR CARRYING OUT THE INVENTION

Figure 1:
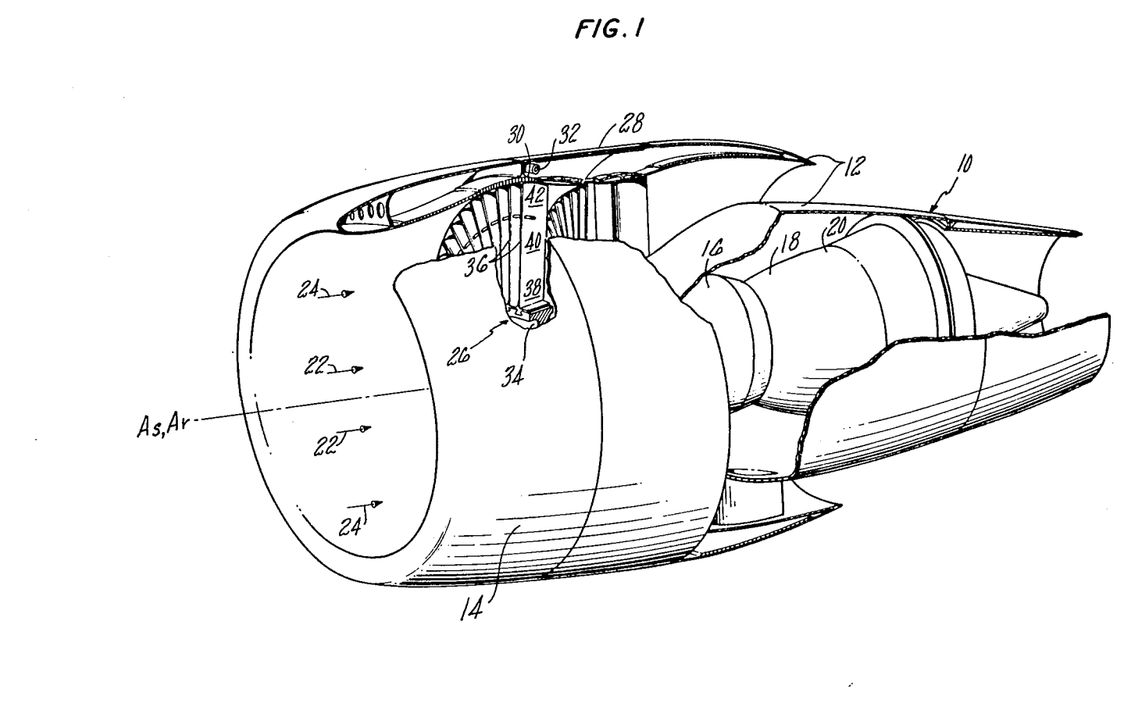
FIG. 1 is a perspective view of an axial flow gas turbine engine mounted in an aircraft nacelle with a portion of the nacelle and the engine broken away to show an array of rotor blades and the adjacent fan case structure in the engine.

A gas turbine engine 10 of the axial flow, turbofan type is shown in FIG. 1. A nacelle 12 circumscribes the engine and is adapted to both support and position the engine from a support structure such as an aircraft wing (not shown). The engine is formed of a fan section 14, a compressor section 16, a combustion section 18 and a turbine section 20. A primary flow path 22 for working medium gases extends rearwardly through these sections. A secondary flow path 24 for working medium gases extends rearwardly outwardly of the primary flow path.

The fan section 14 includes a rotor assembly 26 having an axis of rotation Ar and a stator assembly 28. The stator assembly has an axially extending fan case 30. The case has an axis of symmetry As and forms an inner wall of the nacelle 12. Service components such as a duct 32 for anti-icing air and a starter (not shown) for starting the aircraft with compressed air are disposed radially outwardly of the fan case. The rotor assembly includes a rotor disk 34 and a plurality of rotor blades 36. Each rotor blade has a root region 38, a mid-span region 40 and a tip region 42. The rotor blades extend outwardly from the disk across the working medium flow paths into proximity with the stator assembly.

Figure 2:
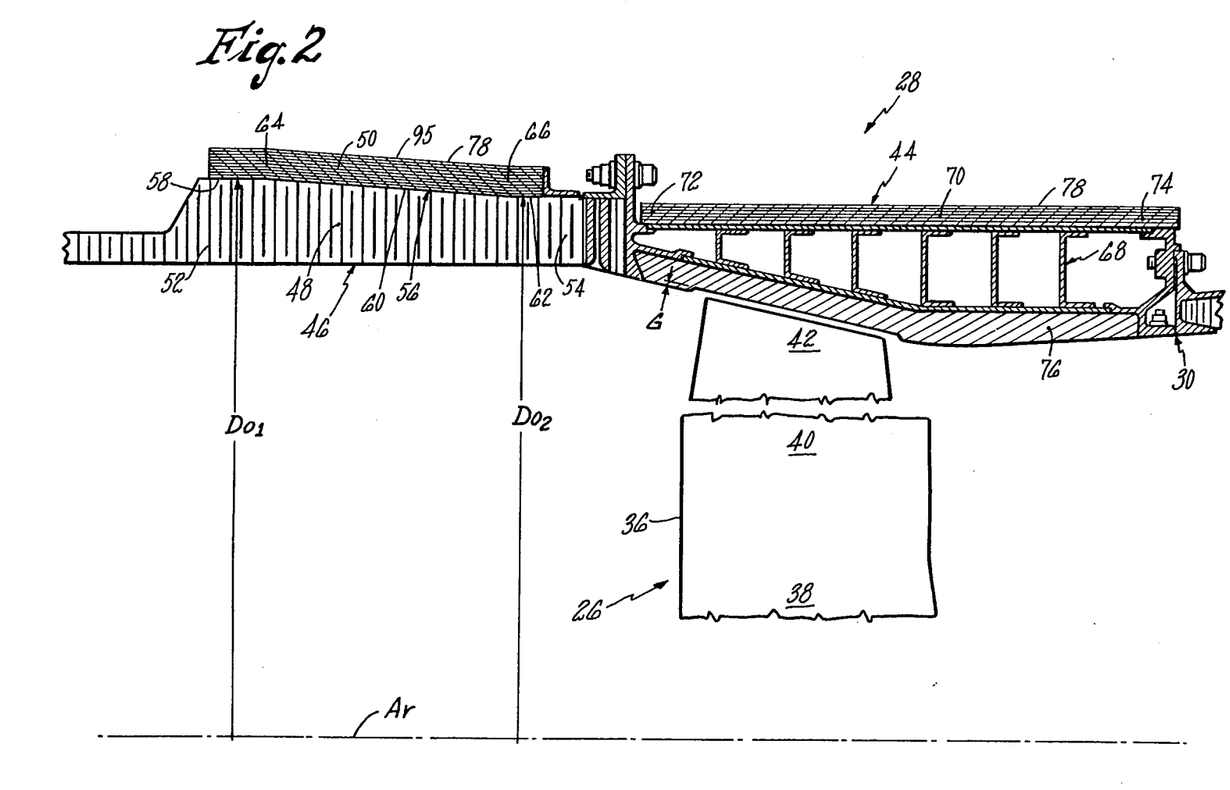
FIG. 2 is a cross-sectional view of the fan case structure adjacent the rotor blade and is a side elevation view of the rotor blade with portions of the rotor blade broken away.

FIG. 2 is an enlarged cross-sectional view of the stator assembly 28 and shows the fan case 30 and one of the rotor blades 36 with portions of the rotor blade broken away. Each rotor blade is spaced radially from the fan case leaving a gap G therebetween.

The fan case outwardly of the rotor blade includes a containment case 44 and a forward containment case 46. Both cases are circumferentially extending structures for containing particles having an axial component of velocity and a radial component of velocity. The forward containment case includes a first casing 48 and a second casing 50. The first casing is a structure for supporting and positioning the second casing. The first casing has a leading edge region 52, a trailing edge region 54 and an outer surface 56. The outer surface is formed of a first cylindrical surface 58 in the leading edge region ($D_{o1}$), a frusto conical surface 60, and a second cylindrical surface ($D_{o2}$) in the trailing edge region 62. The second casing is a flexible casing having a leading edge region 64 and a trailing edge region 66. The flexible casing conforms to the exterior of the first casing. The containment case 44 includes a third casing 68 and a fourth casing 70 outwardly of the third casing. The third casing is a structure for supporting the fourth casing. The fourth casing is a flexible casing having a leading edge region 72 and a trailing edge region 74. The flexible casing conforms to the exterior of the third casing. A rub strip 76 extends circumferentially about the interior of the third casing. The support structures, such as the first casing which is formed of a honeycomb construction or the third casing formed of a hollow beam construction, are lightweight casings but may also be heavier structures such as solid metal cases.

The flexible casing 50 and the flexible casing 70 include a fabric 78 which extends circumferentially about the associated support structures, inner casings 48, 68. The fabric is under tension such that the installed length of the fabric is greater than the free length of the fabric. The term "fabric" includes, but is not limited to, tape, woven material or the like, and may be formed of organic or inorganic material. One satisfactory fabric is formed from a yarn made of aromatic polyamide fibers such as Kevlar 29. (Kevlar is a registered trademark of the DuPont Corporation). The yarn has a fineness of fifteen hundred (1500) deniers. The yarn is woven with a twenty-four (24) strand by twenty-four (24) strand basket weave pattern into a fabric having selvaged edges. A satisfactory fabric having selvaged edges is available as Style 120 Kevlar Fabric from Fabric Development, Incorporated, Quakertown, Pa.

Figure 3:
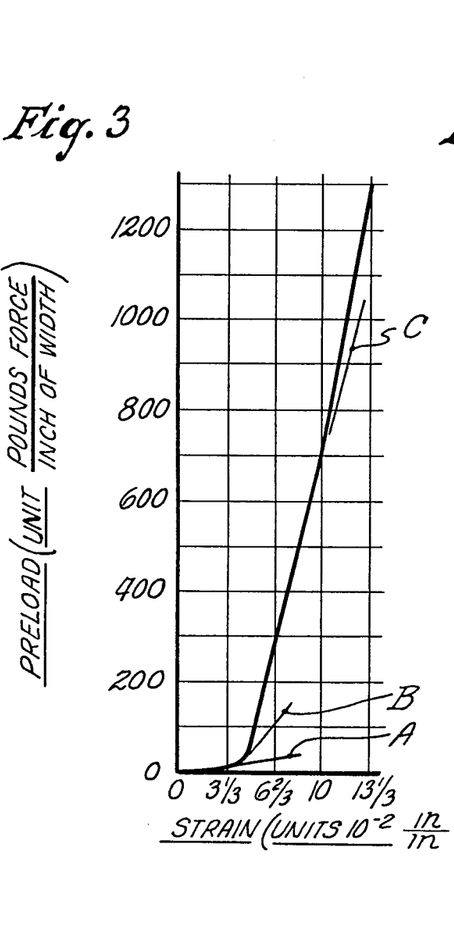
FIG. 3 is a graphical representation of the axial force required to cause an incremental increase in the length of a fabric.

FIG. 3 is a graphical representation of the elongation per length of woven Kevlar 29 fabric resulting from a force acting in the direction of elongation. The vertical axis of the graph is the total force applied to the fabric divided by the width of the fabric in inches. The horizontal axis is the quantity resulting from dividing the total elongation resulting from the application of the force by the free length of the fabric before elongation. The slope of the curve at any point along the curve is a constant of proportionality between the force per unit of width, and the elongation per unit of length of the fabric. The constant of proportionality is often called the force constant, or the stiffness coefficient or the spring constant of the fabric. Thus, the spring constant is defined as the ratio of the force per unit of elongation and may be expressed in pounds force per inch (lb$_f$/in.), or newtons per meter, or in dynes per centimeter. The line A, the line B and the line C shown in FIG. 3 approximate three spring force constants of the fabric which are nearly linear over a range of deflection.

Figure 4:
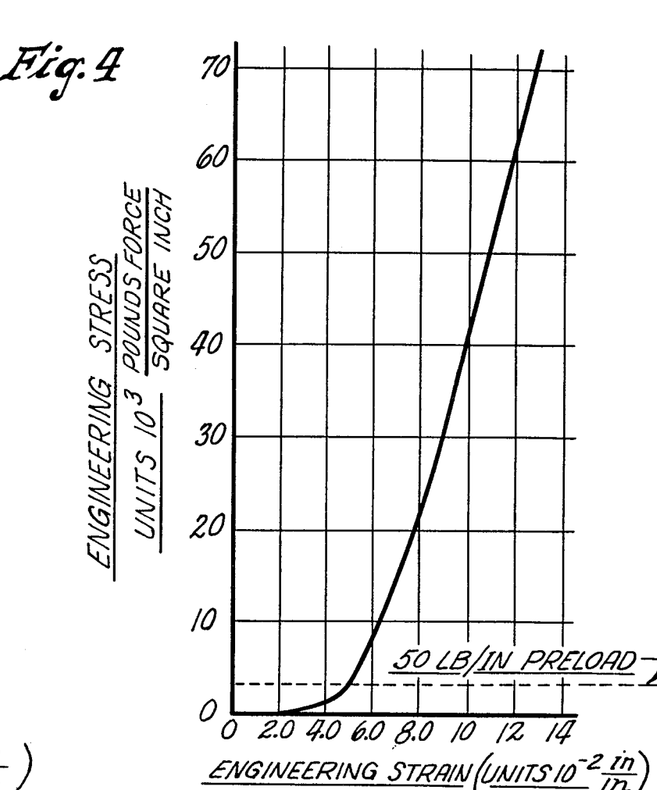
FIG. 4 is a graphical representation of the engineering stress occurring in the fabric versus the engineering strain in the fabric.

FIG. 4 is a graphical representation of engineering stress in the fabric versus the engineering strain of the fabric. The area under the curve is a measure of the amount of work per unit volume of the fabric which may be done on the fabric without causing it to rupture, neglecting frictional forces and adiabatic heating of the fabric.

Figure 5:
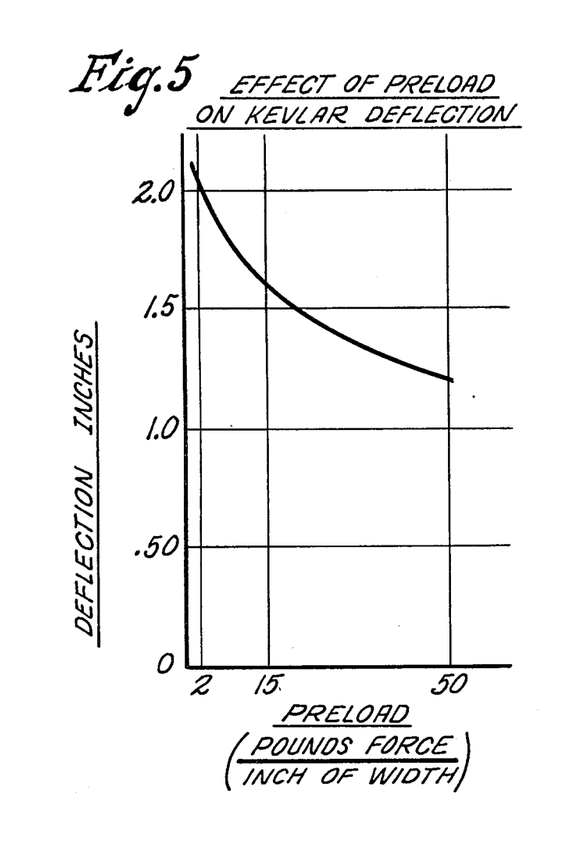
FIG. 5 is a graphical representation of the deflection of the fabric resulting from an impact against the fabric by a projectile having only radial velocity as a function of preload on the fabric in the installed condition.

FIG. 5 is a graphical representation of the deflection of the fabric resulting from an impact against the fabric by a projectile having only radial velocity as a function of preload on the fabric in the installed condition. Fifteen wraps of the woven Kevlar 29 fabric extending circumferentially about a twenty-inch diameter support structure were struck by a one-hundred and ten grain projectile. Testing demonstrated that as the preload on the fabric (and thus the tension) was increased, the amount of deflection of the fabric was decreased.

Figure 6:
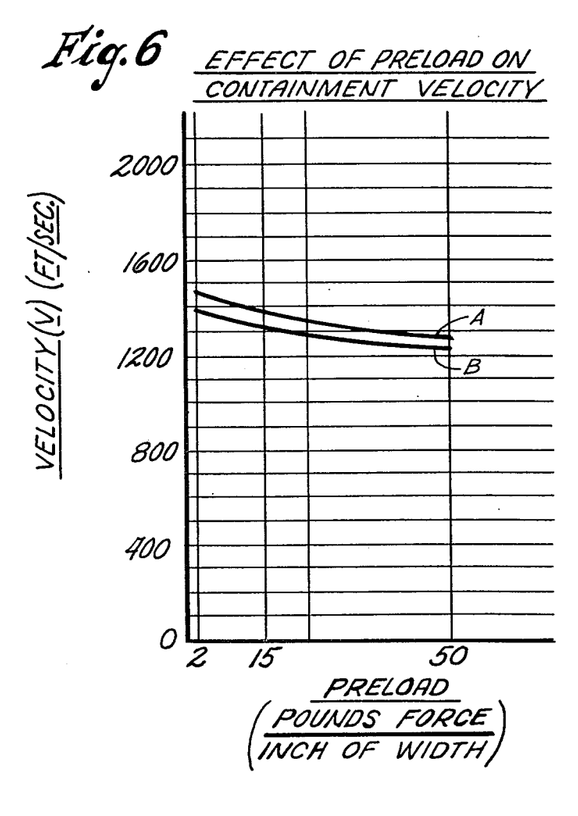
FIG. 6 is a graphical representation of the capability of the preloaded fabric to contain a projectile having only radial velocity as a function of the velocity of the projectile.

FIG. 6 is a graphical representation of the capability of the preloaded wraps of fabric to contain a one-hundred and ten grain projectile. The velocity of projectiles contained and not contained is plotted as a function of the preload (and thus the tension) on the fabric in the installed condition. As with FIG. 5, the projectile was impacted against fifteen wraps of fabric extending circumferentially about a twenty inch diameter support structure. Increased preloads on the fabric decreased the velocity at which the projectile was contained. Curve A is the lowest velocity of projectiles not contained. Curve B is the highest velocity of projectiles contained.

Figure 7:
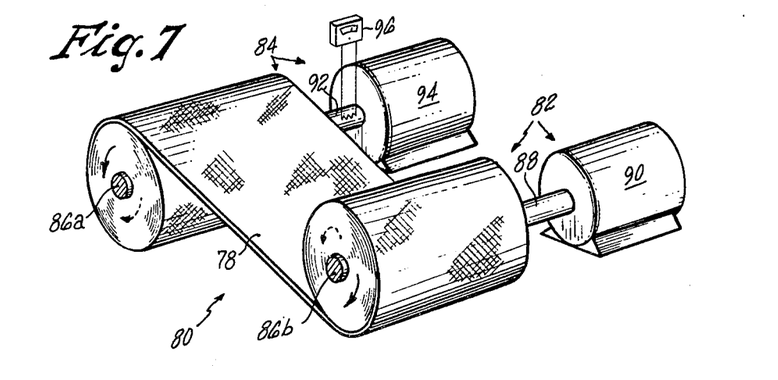
FIG. 7 is a schematic illustration of an apparatus for wrapping fabric under tension during the transfer of fabric from one reel of fabric to another.

FIG. 7 shows a machine 80 for applying a preload to the fabric 78. The machine includes a first apparatus 82 for feeding fabric wrapped at a low tension and a second apparatus 84 for applying the fabric at a higher tension to a reel 86a. The first apparatus 82 for feeding the fabric has a shaft 88 and a means for rotating the shaft 90. A reel 86b is mounted on the shaft and has fabric 78 wrapped on the reel at a first tension. The second apparatus for applying the fabric has a shaft 92, a means 94 for rotating the shaft, and the reel 86a which is initially empty of fabric. A strain guage 96 on the shaft 92 measures the torque being applied to the shaft. The preload and the resulting tension in the fabric are easily determined from the torque in the shaft. The fabric is fed under tension from the reel 86b by rotating the reel through an angle to unwind a first length of the fabric from the reel. A preload (and the associated tension) is applied to the fabric by rotating the reel 86a mounted on the shaft 92 through an angle to wind a second length of fabric onto the reel 86a which is greater than the first length of the fabric. By causing an elongation of a known amount in the length of the fabric, the tension in the fabric resists subsequent deflections of the fabric under the impact of a particle with a spring constant of the fabric which is greater than the first spring constant. For example, this greater spring constant may approximate the third spring constant of the fabric as shown by the line C of FIG. 3. The third spring constant results from applying a tension to the fabric in the installed condition which is equal to the tension that results from applying a uniform load lying in a range of forty-five to fifty-five pounds of force per inch of axial width of fabric wherein the load is distributed uniformly over the width of the fabric, and acts tangentially to the fabric on the minimum cross-sectional area presented by the fabric to the load. For example, such a tension is achieved in a fabric having a width of eleven inches by applying a uniform load to five hundred and fifty (550) pounds of force plus or minus fifty-five ($\pm 55$) pounds to the fabric. Alternatively, the greater spring constant chosen may approximate the second spring constant of the fabric as shown by line B of FIG. 3. The second spring constant corresponds to a fabric under a preload which is greater than or equal to ten pounds per inch of axial width.

An alternate method of applying the preload to the fabric uses at least one intermediate reel 86a. For example, a second reel 86a empty of fabric may be mounted on the shaft 88 of the first apparatus in place of the reel 86b. The apparatus 82 and the apparatus 84 are run in reverse as shown by the broken arrows. The second reel 86a receives fabric from the first reel 86a at a preload which is less than the preload on the fabric in the installed condition. Wrapping the fabric at a smaller preload than, for example, five hundred and fifty (550) pounds of force facilitates control of the tension in the fabric during the wrapping process and results in increasing the elongation of the fabric an incremental amount which is less than the greatest elongation of the fabric in the installed condition. After wrapping the second reel 86a, a third reel 86a may be mounted to the shaft 92 of the second apparatus for feeding the fabric onto the new, third reel 86a. This process may be repeated until the fabric is wrapped on a reel 86a at a preload (and under an associated tension) which is equal to the highest tension in the fabric in the installed condition. The fabric may then be wrapped on a support structure such as the inner casing 48 of FIG. 2.

Figure 8:
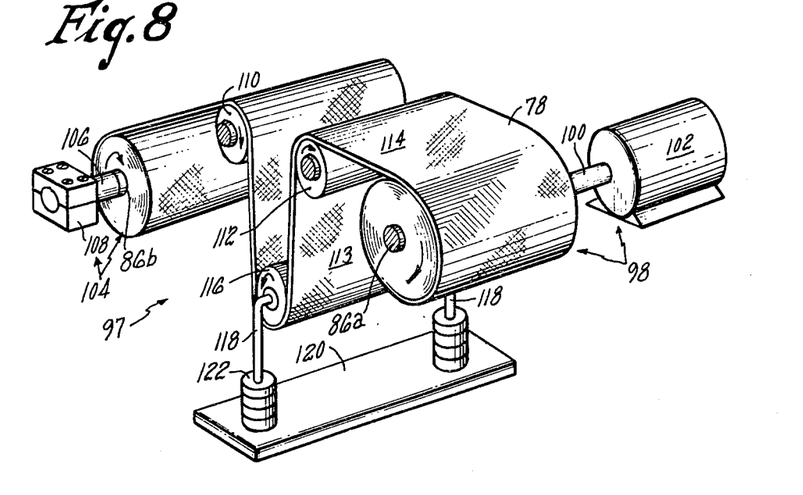
FIG. 8 is a schematic illustration of an alternate embodiment of the apparatus shown in FIG. 7.

FIG. 8 shows an alternate embodiment 97 of a machine for applying a preload to the fabric 78. The machine includes a first apparatus 98 for applying the fabric to the reel 86a. The first apparatus includes a shaft 100 and a means for rotating the shaft 102. A second apparatus 104 for feeding the fabric includes a shaft 106 and a means for rotating the shaft an incremental amount 108. The reel 86b of fabric is attached to the shaft 106. A first roller 110 and a second roller 112 guide the fabric and are attached to a suitable support (not shown). The fabric has an inwardly facing surface 113 and an outwardly facing surface 114.

A third roller 116 rotatably engages the outwardly facing surface 114 of the fabric 78. Two elements, as represented by the bars 118, extend downwardly from the third roller. A shelf 120 is attached to the bars. Weights 122 are placed on the shelf to load the roller and through the roller to provide a preload to the fabric. During the step of applying a preload to the fabric, the fabric is fed from the reel 86b and is taken up by the reel 86a. The shelf, which is suspended by the third roller from the fabric, exerts a predetermined downward force on the fabric even though the height of the roller above a reference plane may vary as the fabric moves through the third roller and applies the preload to the fabric. In an alternate method of applying the preload to the fabric, at least one intermediate reel 86a is used to incrementally increase the preload.

Figure 8A:
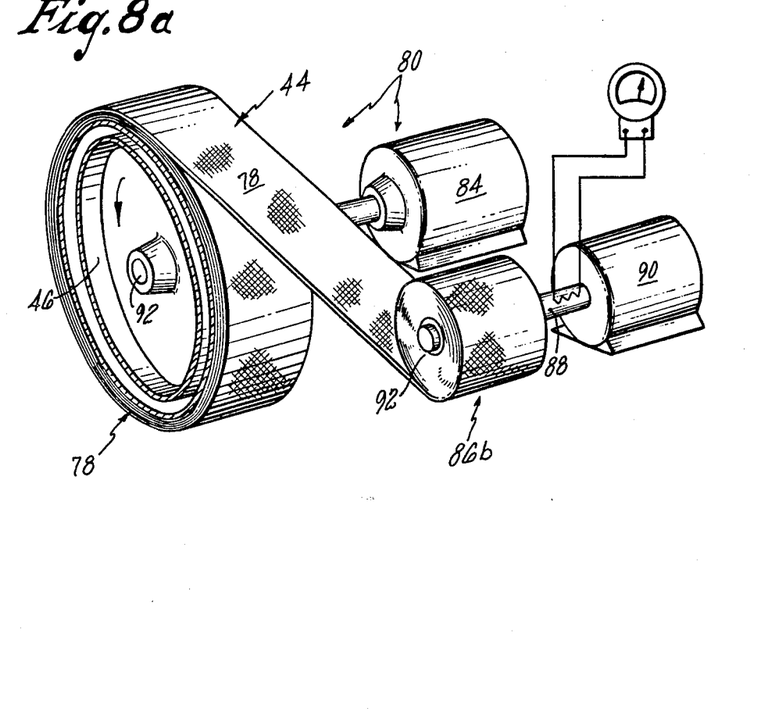
FIG. 8a is a schematic illustration of an apparatus for wrapping fabric under tension about the support structure.

FIG. 8a shows the machine 80 used as a machine for wrapping the preloaded fabric 78 about a support structure such as the inner casing 48. The leading edge of the inner casing is broken away for clarity. The inner casing is mounted on the shaft 92 in place of the take-up reel 86a. The feed reel 86b is wrapped with the preloaded fabric 78. The fabric is wrapped with a preload that is equal to the load (tension) on the fabric in the installed condition at the largest diameter $D_{o_1}$.

Wrapping of the support structure is begun by taping the fabric to the support structure or otherwise holding the fabric in place and hand laying one hundred-eighty degrees (180°) of the first wrap with no load on the fabric (zero tension). The remaining one hundred-eighty degrees of the first wrap is applied and, as this second half of the first wrap is applied, the tension in the fabric is increased by uniformly increasing the load from zero pounds of force (0 $lb_f$) to the level of tension in the fabric outwardly of the largest diameter $D_{o_1}$. The fabric is wound on the inner casing and does not contract in the leading edge region 64 of the fabric outwardly of the largest diameter $D_{o_1}$. As the fabric is wound on the case at a constant rate of feed, the fabric contracts along the frusto conical surface 60 and the second cylindrical surface 62 with respect to the fabric in the leading edge region. As a result, the fabric in the leading edge region has an installed length outwardly of the first diameter $D_{o_1}$ which is greater by a first amount than the free length of the fabric. The fabric in the trailing edge region has an installed length outwardly of the second diameter which is greater than the free length of the fabric by a second amount. The case is contoured such that the contraction causes a preload of eighteen pounds of force per inch of axial length of fabric in the trailing edge region (18 $lb_f$/in.) and a preload of fifty pounds of force plus or minus five pounds of force per inch of axial length (50±5 $lb_f$/in.) of the fabric. The fabric under such a load has elongated approximately five percent (5%) of the free length of the fabric in the leading edge region and approximately three percent (3%) of the free length of the fabric in the trailing edge region. The tension is maintained within these limits and an additional 38 wraps are applied to the case. The last containment wrap (thirty-ninth wrap) is applied over the preceding containment wrap (thirty-eighth wrap). The frictional force between all of the wraps of the fabric is such that leaving the thirty-ninth wrap free would result in a small amount of unwrapping and a relaxation of the tension in only the outermost layers of the fabric. The relaxation in tension in the outermost layer is avoided by securing the fabric against unwrapping. One method of securing the fabric against unwrapping includes the step of restraining a portion of the fabric against movement with respect to a second portion of the fabric such as by bonding a portion of the fabric to a second portion of the fabric. For example, the last containment wrap (thirty-ninth wrap) is secured against unwrapping by bonding the outwardly facing surface of the thirty-eighth wrap to the inwardly facing surface of the thirty-ninth wrap. The bonding is done by applying a rubber base adhesive to a portion of one of the surfaces, pressing the adhesive-covered surface against the faying surface and restraining the fabric against movement until the adhesive cures. One satisfactory rubber-base adhesive is a silicone rubber compound, such as RTV 159 silicone rubber compound distributed by the General Electric Corporation, Silicone Products Division, Waterford, N.Y. This particular adhesive is cured at room temperature.

The nacelle shields the exterior of the fabric from damage in the installed condition. An additional wrap (fortieth wrap) is applied in tension over the preceding wrap (thirty-ninth wrap). A second shield 95 is provided by applying a coating of epoxy resin to the exterior of the wrapped fabric. The method of forming the shield includes the step of applying a first coating of epoxy resin between the beginning of a forty-first wrap and the beginning of the fortieth wrap and to the outer surface of the wrapped fabric. The epoxy resin has a viscosity during application which is in the range of ten to sixteen Pascal-seconds (10–16 Pa·s). The fabric is held under tension until the epoxy cures. The first coating of epoxy resin does not penetrate to the thirty-ninth wrap because the tension on the fabric causes the strands of the fabric to press tightly one to the other blocking penetration of the fabric by the resin. The high viscosity of the epoxy resin of the first coating retards the penetration of the resin into the fabric as the resin cures. Moreover, as the epoxy resin cures, the resin generates heat, which increases the rate at which the resin cures. The method of forming a shield includes the additional step of applying a second coating of epoxy resin to the first coating of epoxy resin, the second coating having a second viscosity during application in the range of five-tenths to seven-tenths Pascal-seconds (0.5–0.7 Pa·s). The second coating of epoxy resin cannot penetrate the first coating of epoxy resin because the first coating of epoxy resin has cured and forms a shield against penetration. In addition to applying the epoxy resin to the outer surface of the fabric, the resin may also be applied to the edges of the wrapped fabric. One satisfactory epoxy resin for the first coating is EPON Resin 828 epoxy resin distributed by the Shell Chemical Company, a division of Shell Oil Company, Houston, Tex. One satisfactory epoxy resin for second coating is EPON Resin 815 or 8132 epoxy resin which is available from the Shell Chemical Company. A satisfactory curing agent for the three resins from the Shell Chemical Company is EPON U Curing Agent which is available from the Shell Chemical Company.

The containment case 44 is formed in an identical fashion except that the fabric 78 is applied to the inner (third) casing with a uniform tension. The preload (and resulting tension) is fifty-pounds of force plus or minus five pounds of force per inch of axial length (50±5 $lb_f$/in.) of the fabric. As will be realized, the inner casing 68 in some embodiments might have a frusto conical shape to tailor the preload in the axial direction as does the inner casing 48.

During operation of the gas turbine engine, the rotor assembly 26 shown in FIG. 2 rotates about the axis rotation Ar at speeds as high as four thousand revolutions per minute (4,000 r.p.m.). As the rotor assembly rotates, the disk 34 exerts a centripetal force on the root region 38 of the rotor blade 36 causing the blade to follow a circular path about the axis of rotation. An impact on the blade by a foreign object may cause the blade to fail in the root region. The following description is illustrative of a typical interaction between the blade, the support structure and the fabric during such a blade failure. This description is not an exhaustive description of all possible interactions between the components during the blade failure. Upon failure, the failed blade breaks in the root region and moves radially outwardly across the gap G (between the tip region 42 and the rub strip 76). The blade strikes the rub strip and fragmentizes. Typically, the tip region of the blade breaks off from the rotor blade leaving behind the root 38 and midspan portion 40 of the blade. Although the fragment is confined to the flow path by the rub strip, the fragment has a large component of radial velocity by reason of the rotational energy of the blade. The tip fragment has a relatively high axial velocity because of the shape of the flow path and because of the difference in pressure which exists between the leading edge and the trailing edge of the blade. As the tip region fragment moves forwardly and circumferentially, the fragment strikes the inner casing 48 of the forward containment case 46, slashing through the inner casing which is dimensioned to enable this penetration. The fragment strikes the flexible casing 50. Because of the radial velocity of the fragment, a portion of the kinetic energy of the fragment is transferred to the flexible casing 50 causing the flexible casing to deflect outwardly away from the inner casing.

Figure 9:
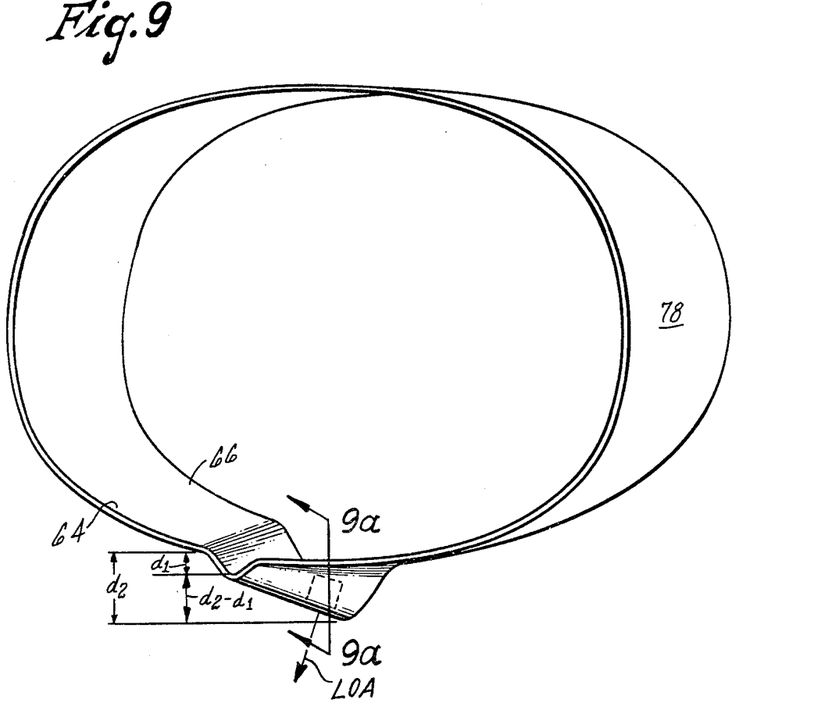
FIG. 9 is a schematic representation of the response of the fabric to an impact by a fragment of the blade.

FIG. 9 is a schematic illustration of the deflection of the tensioned Kevlar fabric 78 which forms the flexible casing 50. The inner casing 48 and all wraps of the fabric but one wrap are broken away for clarity. The trailing edge region 66 of the fabric is at a lower tension than the leading edge region of the fabric by reason of the contour of the case. The impact of the fragment causes the high tensioned leading edge portion of the fabric to elongate and deflect outwardly a lesser amount ($d_1$) in response to the force of the fragment than does the low tensioned fabric ($d_2$) in the trailing edge region. A cone-like shape results in the fabric. The line of action of the particle LOA has components in the axial, the radial and the tangential (circumferential) directions. The fragment is guided circumferentially about the inner surface of the fabric by reason of its circumferential velocity in the cone formed as a result of its radial energy.

Figure 9A:
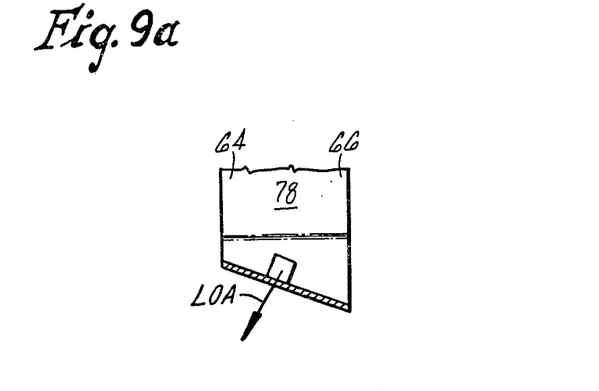
FIG. 9a is a view taken along the lines 9a—9a of FIG. 9.

FIG. 9a is a section taken along the lines 9a—9a of FIG. 9 showing the line of action LOA of the fragment. As the fragment moves in the axially forward direction, the fragment exerts a force against the cone; the fabric blocks the fragment from movement in the axial direction. A loss in axial momentum results and the fragment loses its axial velocity resulting in containment of the particle within the nacelle.

After the tip region of the blade fragmentizes and the fragment moves forwardly, into the forward containment structure, the remainder of the blade (the midspan and base region) is left behind to form a second portion 108 of the blade. The second portion of the blade moves radially outwardly across the radial distance formerly occupied by the tip region and across the gap G to strike the rub strip. The second portion of the blade is of larger size and has more energy than the tip region of the blade.

Figures 10, 11:
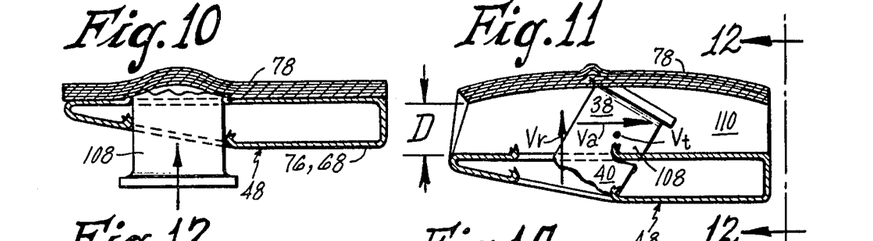
FIG. 10 is a schematic representation of a portion of a blade moving outwardly, piercing the rub strip and support structure.
FIG. 11 is a schematic representation of a portion of a blade that has penetrated the support structure and deflected the fabric wrapping.

As shown in the FIG. 10 schematic representation, the energy and strength of the second portion 108 of the blade enables the second portion of the blade to penetrate the rub strip 76 and the inner casing 68 without shattering the blade portion and to strike the Kevlar fabric 78. The Kevlar fabric restrains the outward movement of the second portion of the blade and decreases the outward velocity of the blade.

As the second portion 108 of the blade moves outwardly, the second portion of the blade is struck from behind by the adjacent (following) blade. The following blade turns the root region 38 of the blade outwardly and the midspan region 40 inwardly and drives the second portion of the blade around the circumference of the inner casing, slashing a hole in the inner casing. The second portion of the blade has an axial rearward component of velocity $V_a$ as a result of being struck by the following blade and because of this contact and the rotational energy of the blade, the second portion of the blade has also a radial outward component of velocity $V_r$ and a tangential component velocity $V_t$ in a circumferential direction. As shown in the FIG. 11 schematic representation, the second portion of the blade 108 has penetrated through the inner casing and has impacted against the fabric 78 causing the fabric to deflect outwardly a distance D away from the case.

Figures 12A, 13, 15:
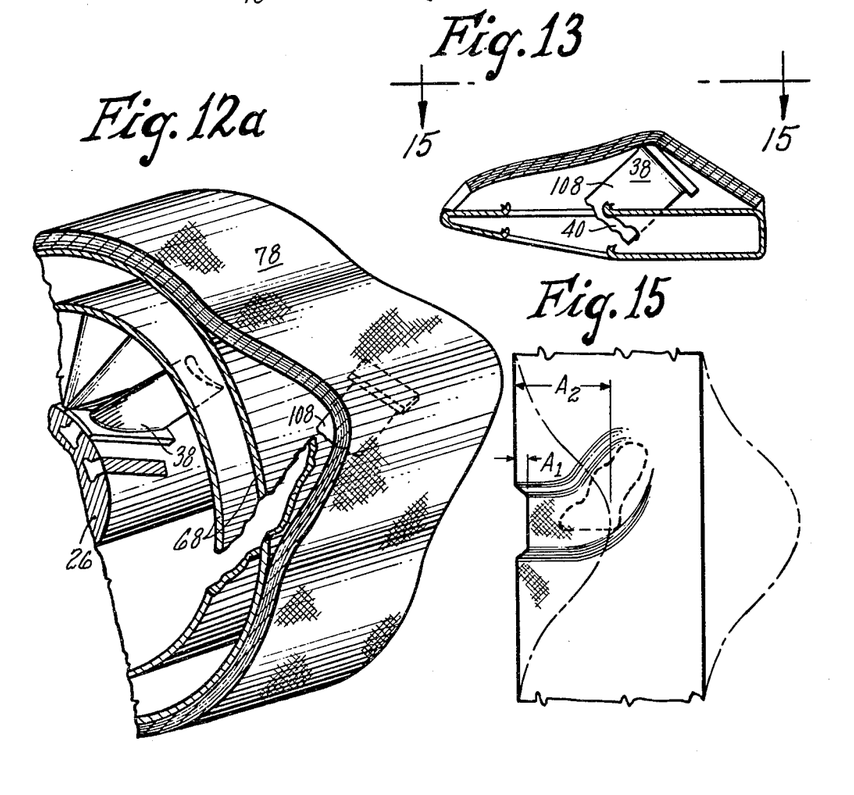
FIG. 12a is a perspective view of the rotor assembly, the blade fragment of the rotor assembly, the support structure and the fabric, partly in section and partly broken away.
FIG. 13 is a schematic representation corresponding to FIG. 10 of the portion of the blade after the blade has moved axially with respect to the point of penetration of the support structure.
FIG. 15 is a plan top view along the lines 15—15 of FIG. 13.

FIG. 12 is a side elevation view taken along the lines 12—12 of the schematic representation shown in FIG. 11. FIG. 12a is a perspective view of the rotor assembly 26, the blade portion 108, the inner casing 68 and the fabric 78. As the second portion of the blade strikes the fabric and causes the fabric to deflect, a passageway 110 opens for the blade in the axial direction. As shown in FIG. 3, the preload causes the layers of Kevlar fabric to exert a greater radial force during an incremental deflection than the force exerted by untensioned Kevlar fabric during the same deflection. The preload also increases the amount of work absorbed per unit of elongation of the fabric as shown by the area under the stress-strain curve in FIG. 4. Thus, the deflection of the fabric away from the support structure for each unit of energy absorbed is decreased as compared with loosely wrapped fabric.

Experiments on ballistic models indicate that a Kevlar fabric wrap under no tension when hit by a particle will deflect a distance D of seven and one-half (7.5 in.) away from a support structure 48 having a diameter of eighty (80) inches. These experiments indicate that loading the Kevlar fabric with a load of fifty pounds force plus or minus five pounds ($50 \pm 5$ lb$_f$) per inch of axial width, will decrease the deflection D of the Kevlar from seven and one-half inches (7.5 in.) to three and one-half inches (3.5 in.).

After the maximum deflection of the fabric, the tensioned fabric moves inwardly. The passageway 110 closes before the axial component of velocity of the second portion of the blade causes the blade to move through the passageway out from under the Kevlar fabric. As mentioned earlier, contouring the inner casing 68 would cause the passageway to close even faster with respect to the upstream fabric by having the largest diameter of the cone in the trailing edge region.

Figure 14:
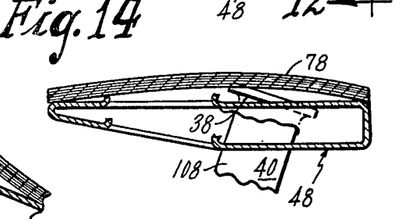
FIG. 14 is a schematic representation of the blade fragment trapped between the support structure and circumferentially extending fabric.

As shown in FIG. 13 and FIG. 14, the Kevlar fabric begins to snap back towards the case around the blade fragment trapping the fragment between the support inner casing and the Kevlar fabric.

As shown in FIG. 15, a reduced plan view, the load (and the associated tension) in the Kevlar fabric also limits the deflection of the Kevlar fabric in the axial direction causing the Kevlar fabric to move axially rearwardly a small distance $A_1$ as compared with the distance $A_2$ that untensioned Kevlar fabric (shown in dotted line) might move. The small axial deflection of the Kevlar fabric keeps the fabric over the hole through the support structure and avoids exposing the nacelle to additional fan blade fragments from other damaged fan blades which might otherwise exit through the inner casing and past the moved Kevlar.

Although the invention has been shown and described with respect to preferred embodiments thereof, it should be understood by those skilled in the art that various changes and omissions in the form and detail thereof may be made therein without departing from the spirit and scope of the invention.

We claim:

1. A method of forming a circumferentially extending structure to contain particles having an axial component of velocity and a radial component of velocity, the structure including a flexible casing formed of a circumferentially extending fabric which includes the steps of;
   forming a first structure having a first outer diameter, a second outer diameter not equal to the first diameter, and an exterior surface extending therebetween for supporting and positioning a fabric;
   forming a flexible casing about the first structure by wrapping a fabric about the first structure under tensions such that the installed length of the fabric is greater than the free length of the fabric by a first amount at the first diameter and a lesser amount at the second diameter.

2. A method of forming a containment case for a rotary machine, the containment case including a fabric extending circumferentially about the case, including the steps of:
   forming a structure having a first outer diameter, a second outer diameter not equal to the first diameter and an exterior surface extending therebetween for supporting and positioning the fabric;
   applying a preload to the fabric to cause an elongation of the fabric;
   securing the elongated fabric against contraction;
   forming a flexible casing by wrapping the preloaded, elongated fabric about the support structure under tension; wherein the variation in diameter of the surface results in a variation in tension in the fabric in the installed condition.

3. The method of forming a containment case of claim 2 wherein the surface extending between the first diameter and the second diameter is a frusto conical surface.

4. The method of forming a containment structure of claim 3 wherein the support structure has an edge region and the first outer diameter of the structure is in the edge region.

5. The method of forming a containment case of claim 4 wherein the edge region is the leading edge region.

6. The method of forming a containment structure of claim 2 wherein the step of applying a preload to the fabric includes the step of increasing the preload until an elongation occurs of at least five percent (5%) of the free length of the fabric.

7. The method of forming the containment structure of claim 2 wherein the step of applying a preload to the fabric includes the step of suspending a weight from the fabric.

8. The method of forming a containment case of claim 2 wherein the fabric has a first spring constant under a first tension and a second spring, constant under a second tension which is greater than the first spring constant and wherein the step of wrapping the fabric about the support structure occurs under a level of tension in a portion of the fabric which is equal to or greater than the second tension.

9. The method of forming a containment case of claim 8 which further includes the step of securing the fabric against unwrapping by restraing a portion of the fabric against movement.

10. The method of forming a containment structure of claim 8 wherein the fabric has an end and the step of wrapping the preloaded fabric includes the step of securing the end of the fabric to the support structure.

11. The method of forming a containment case of claim 8 wherein the step of securing the fabric against unwrapping further includes the step of restraining a portion of the fabric against movement with respect to a second portion of the fabric.

12. The method of forming the containment case of claim 11 wherein the fabric has a first surface facing outwardly and a second surface facing inwardly, wherein the step of wrapping the fabric about the support structure further includes the step of applying at least one complete wrap to the structure and the step of securing the elongated fabric against unwrapping includes the step of bonding a portion of the outwardly facing second surface to a portion of the inwardly first facing surface.

13. The method of forming a containment case of claim 12 wherein the step of bonding a portion of the outwardly facing surface to a portion of the inwardly facing surface includes the steps of applying a rubber base adhesive to a portion of one of the surfaces, pressing the adhesive covered surface against the faying surface, and restraining the fabric against movement.

14. The method of forming a containment case of claim 2 wherein the step of wrapping the fabric about the support structure is performed at a tension in the preloaded fabric which is equal to the tension produced by a load is equal to or greater than ten pounds of force per inch of axial length of fabric wherein the load is distributed uniformly over the width of the fabric and acts tangentially to the fabric on the minimum cross-sectional area presented by the fabric to the load.

15. The method of forming a containment case of claim 8 wherein the step of wrapping the fabric about the support structure is performed at a tension in the preloaded fabric which is equal to the tension produced by a load which is equal to or greater than ten pounds of force per inch of axial length of fabric wherein the load is distributed uniformly over the width of the fabric and acts tangentially to the fabric on the minimum cross-sectional area presented by the fabric to the load.

16. The method of forming a containment case of claim 8 wherein the preload lies in a range of forty-five (45) of force to fifty-five pounds of force per inch of axial length of fabric.

17. The method of forming a containment case of claims 2, 3, 4, and 5 wherein the step of applying a preload to the fabric to cause an elongation of the fabric includes the step of wrapping the fabric circumferentially around at least one reel to increase the elongation an incremental amount which is less than or equal to the elongation of the fabric in the installed condition.

18. The method of forming a containment case of claim 8 which further includes the step of forming a shield over the exterior of the fabric.

19. The method of forming a containment structure of claim 17 wherein the step of forming a shield includes the step of applying a coating of epoxy resin to the exterior of the wrapped fabric.

20. A containment structure for a rotary machine which includes:
   a support structure having a first outer diameter, a second outer diameter not equal to the first outer diameter and an exterior surface extending therebetween;
   a flexible casing formed of a fabric extending circumferentially about the structure under tension in the installed condition, the fabric having a free length and an installed length, the installed length of the fabric outwardly of the first diameter being greater by a first amount than the free length of the fabric, and the installed length of the fabric outwardly of the second diameter being greater by a second amount than the free length of the fabric, wherein the second amount is not equal to the first amount such that the associated tension in the elongated fabric outwardly of the first diameter of the structure is not equal to the tension in the elongated fabric outwardly of the second diameter.

21. The containment structure of claim 20 wherein the surface extending between the first diameter and the second diameter is a frusto conical surface.

22. The containment structure of claims 20 or 21 wherein the support structure has an edge region and first outer diameter of the structure is in the edge region.

23. The containment structure of claim 22 wherein the rotary machine has an array of rotor blades, the containment structure is a forward containment structure forwardly of the array of rotor blades wherein the edge region is the leading edge region and the first diameter is greater than the second diameter.

24. The containment structure of claim 23 wherein the tension in the portion of the fabric outwardly of the first diameter, is equal to the tension produced by a load lying in a range of forty-five pounds to fifty-five pounds of force per inch of axial width of the fabric wherein the load is distributed uniformly over and acts tangentially to the portion of the fabric on the minimum cross-sectional area presented by the fabric to the load.

25. The containment structure of claim 24 wherein the portion of the fabric outwardly of the first diameter is a first portion and the portion of the fabric outwardly of the second diameter is a second portion and the tension in the second portion of the fabric is equal to the tension produced by a load of eighteen pounds of force per inch of axial width of the fabric wherein the load is distributed uniformly over and acts tangentially to the portion of the fabric on the minimum cross-sectional area presented by the fabric to the load.

* * * * *